United States Patent [19]

Hopenfeld

[11] Patent Number: 5,187,366

[45] Date of Patent: Feb. 16, 1993

[54] SENSORS FOR DETECTING LEAKS

[76] Inventor: Joram Hopenfeld, 1724 Yale Pl., Rockville, Md. 20850

[21] Appl. No.: 799,116

[22] Filed: Nov. 27, 1991

Related U.S. Application Data

[63] Continuation-in-part of Ser. No. 720,229, Jun. 25, 1991.

[51] Int. Cl.$^5$ ............................................. H01J 5/16
[52] U.S. Cl. .................................... 250/302; 250/303; 250/301; 250/356.2; 250/227.21
[58] Field of Search ............ 250/302, 303, 307, 356.2, 250/357.1, 458.1, 461.1, 227.21, 227.25; 385/12, 13

[56] References Cited

U.S. PATENT DOCUMENTS

| | | |
|---|---|---|
| H652 | 7/1989 | Davis et al. |
| 539,234 | 5/1895 | Neu . |
| 1,123,012 | 12/1914 | Roby . |
| 1,135,798 | 4/1915 | Hirschmann . |
| 1,271,865 | 7/1918 | Dodds . |
| 2,386,412 | 10/1945 | Wakefield . |
| 2,759,175 | 8/1956 | Spalding . |
| 3,045,223 | 7/1962 | Kapany et al. |
| 3,255,324 | 6/1966 | Ovshinsky . |
| 3,383,863 | 5/1968 | Berry . |
| 3,470,340 | 9/1969 | Hakka . |
| 3,492,449 | 1/1970 | Kenny . |
| 3,540,025 | 11/1970 | Levin et al. |
| 3,548,137 | 12/1970 | Farrell et al. |
| 3,564,526 | 2/1971 | Butts . |
| 3,721,898 | 3/1973 | Dragoumis et al. |
| 3,787,650 | 1/1974 | Lewis . |
| 3,867,837 | 2/1975 | Malin . |
| 3,970,863 | 7/1976 | Kishikawa et al. |
| 3,995,168 | 11/1976 | Neuscheler et al. |
| 4,038,650 | 7/1977 | Evans et al. ............... 340/244 R |
| 4,045,668 | 8/1977 | Pitt et al. |
| 4,069,838 | 1/1978 | Hansel et al. |
| 4,118,105 | 10/1978 | Voigt . |
| 4,118,634 | 10/1978 | Carvalko et al. |
| 4,155,013 | 5/1979 | Spiteri . |
| 4,156,149 | 5/1979 | Vaccari . |
| 4,159,420 | 6/1979 | Tsunoda . |
| 4,246,575 | 1/1981 | Purtell et al. |
| 4,256,403 | 3/1981 | Powell . |
| 4,266,878 | 5/1981 | Auer . |
| 4,270,049 | 5/1981 | Tanaka et al. ............... 250/227.25 |
| 4,379,289 | 4/1983 | Peek . |
| 4,386,269 | 5/1983 | Murphy . |

(List continued on next page.)

Primary Examiner—Jack I. Berman
Assistant Examiner—Kiet T. Nguyen

[57] ABSTRACT

A sensor for detecting leakage of a particular fluid into an area to be monitored, such as an interstitial space of a double-walled tank or pipeline, comprises first and second fiber optics. A first end of the first fiber optic is disposed to a source of light and a first end of the second fiber optic is disposed to a detector of light. The second ends of the fiber optics are axially aligned with one another. Under normal circumstances light is transmitted from the source to the first fiber optic across the gap into the second fiber optic, and is detected by the detector. The fiber optics are arranged such that when the sensor is exposed to a material to be monitored, effective light-transmission between the second ends of the fiber optics is prevented, preventing light from being transmitted from the source to the detector. This provides a simple and fool-proof method of detecting leakage of the fluid to be monitored into the area to be monitored.

24 Claims, 2 Drawing Sheets

OTHER PUBLICATIONS

Seitz, CRC Critical Review in Analytical Chemistry (1988), vol. 19, Iss. 2, pp. 135–173.
Kawahara, Analytica Chimica Acta, (1983), 151, pp. 315–325.
Sutherland, Analytical Letters, (1984), 17(B1), pp. 45–53.
Giuliani, Sensors and Actuators, (1984), 6, pp. 107–112.
Butler, Appl. Phys. Lett. (1984), 45, pp. 1007–1009.
Dessy, Analytical Chemistry, (1985), 57, pp. 1188–1202.
Giuliani, Optics Letters (1983), 8, pp. 54–56.
Goldfinch, Analytical Biochemistry (1984), 138, pp. 430–436.

U.S. PATENT DOCUMENTS

| | | |
|---|---|---|
| 4,468,567 | 8/1984 | Sasano et al. . |
| 4,634,856 | 1/1987 | Kirkham . |
| 4,645,923 | 2/1987 | De Blok et al. .................... 250/227 |
| 4,675,527 | 6/1987 | Asher et al. . |
| 4,682,156 | 7/1987 | Wainwright . |
| 4,682,895 | 7/1987 | Costello ............................... 385/12 |
| 4,689,484 | 8/1987 | McMahon . |
| 4,749,856 | 6/1988 | Walker et al. ...................... 250/227 |
| 4,763,009 | 8/1988 | Fevrier et al. . |
| 4,779,453 | 10/1988 | Hopenfeld . |
| 4,812,014 | 3/1989 | Sawano et al. . |
| 4,827,121 | 5/1989 | Vidrine, Jr. et al. . |
| 4,834,496 | 5/1989 | Blyler, Jr. et al. . |
| 4,851,817 | 7/1989 | Brossia et al. . |
| 4,857,472 | 8/1989 | Wolfbeis . |
| 4,882,499 | 11/1989 | Luukkala et al. . |
| 4,888,455 | 12/1989 | Hanson . |
| 4,892,383 | 1/1990 | Klainer et al. ....................... 385/12 |
| 4,897,551 | 1/1990 | Gersh et al. . |
| 4,915,473 | 4/1990 | Haese et al. ...................... 350/96.29 |
| 4,920,261 | 4/1990 | Block et al. ........................... 385/12 |
| 4,922,748 | 5/1990 | Hopenfeld . |
| 4,934,811 | 6/1990 | Watts et al. .......................... 356/73 |
| 5,004,913 | 4/1991 | Kleinerman . |
| 5,005,005 | 4/1991 | Brossia et al. . |
| 5,015,843 | 5/1991 | Seitz et al. ...................... 250/227.21 |
| 5,030,420 | 7/1991 | Bacon et al. . |
| 5,043,285 | 8/1991 | Surgi . |
| 5,062,686 | 11/1991 | Barrow et al. . |
| 5,096,671 | 3/1992 | Kane et al. .............................. 385/12 |

OTHER PUBLICATIONS

Goldfinch, Analytical Biochemistry (1980), 109, pp. 216–221.

Freeman, Analytica Chimica Acta (1985), 177, pp. 121–128.

Smith, Applied Spectroscopy (1988), 42, pp. 1469–1472.

Pawliszyn, Rev. Sci. Instrum. (1987), 58, pp. 245–248.

Katchalsky, J. Polymer, Sci. (1951), 7.

Feigenbaum, J. Poly. Sci (1971), 9, pp. 817–820.

Kissinger, Measurements & Control, Apr. 1988.

Giallorenzi et al, "Optical-fiber Sensors Challenge the Competition", IEEE Spectrum, Sep. 1986, pp. 44–47 (partial copy).

Shelley, "Newsfront" article, Chemical Engineering, Jan. 1991, pp. 31, 33 & 35.

Rica, "Inhibitor-injection Program Showing Early Promise", Oil & Gas Journal, May 13, 1991, pp. 57–59.

Brochures of In-Situ, Inc., re: KW-140 Monitor, KW-240 Monitor, KW-241 Monitor, KW-242 Monitor, Leak Detection Systems, and Remote Stations, all undated.

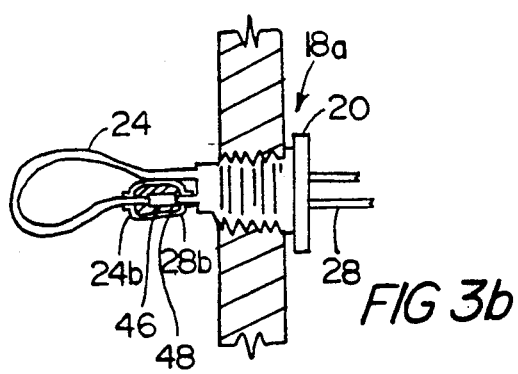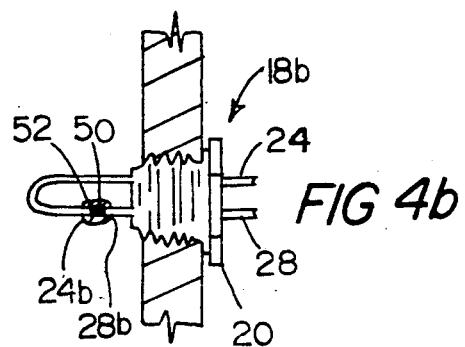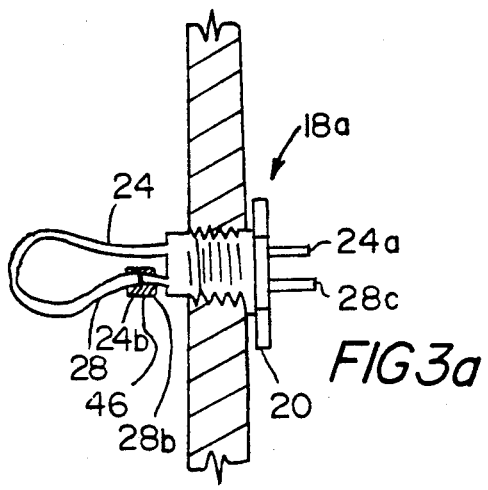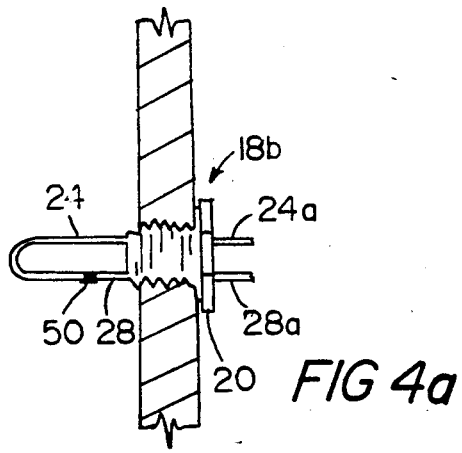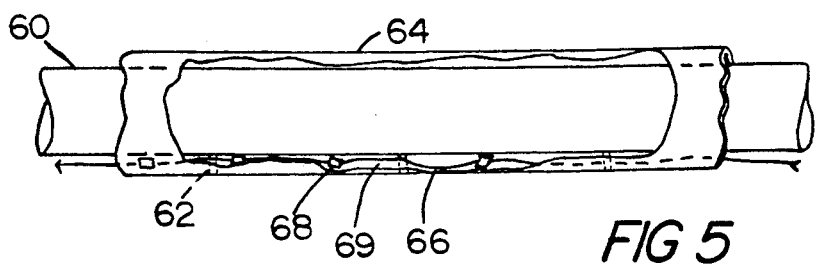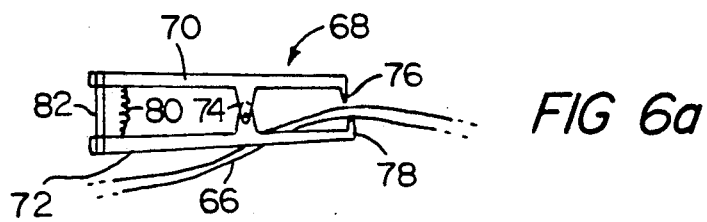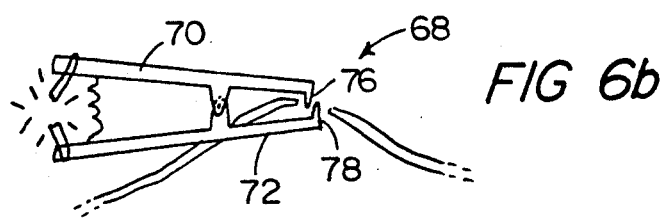

SENSORS FOR DETECTING LEAKS

BACKGROUND OF THE INVENTION

Cross Reference to Related Applications

This application is a continuation-in-part of application Ser. No. 07/720,229 filed Jun. 25, 1991 by the same inventor.

FIELD OF THE INVENTION

This invention relates to inexpensive and reliable sensors for detecting leaks that are particularly suitable for being disposed between the walls of double-walled tanks, between inner and outer pipes of double-walled piping, in soil, and for related uses.

Description of the Prior Art

The prior art includes many attempts to provide reliable detection of leaks of the contents of tanks, pipelines and the like. Detection of leaks in a simple, efficient and reliable fashion is highly desired at present because of increased public awareness of the sensitivity of the environment to chemical spills and the like. Moreover, increasing regulatory activity mandates reduction of industrial leakage of toxic chemicals and the like, and detection and cure of such leaks before their effects can become dangerous or catastrophic.

The prior art has not provided suitable sensors for detecting leaks from tanks, including both single and double-walled tanks, and including tanks on ships, railcars, trucks and the like, as well as tanks buried in or resting on the ground, and from double-walled pipelines and other vessels. In many circumstances, individual valves, pumps and fittings must be separately monitored, necessitating a simple and inexpensive sensor. In general, prior art leak detectors have been unduly complicated and thus both expensive and prone to erroneous signals. Moreover, many prior art leak detectors attempt to provide quantitative measurement of leakage, requiring costly construction techniques, frequent calibration, complex instrumentation and the like.

The art requires a simple, low cost, fool-proof sensor providing unambiguous, objective detection of leaks.

OBJECTS AND SUMMARY OF THE INVENTION

It is therefore an object of the invention to provide a simple, low-cost, easily installed, readily monitored sensor for detection of leaks, particularly suitable for monitoring the interstitial spaces of double-walled tanks or pipelines and the like, and also suitable for detecting leaks from other sources, such as pumps, valves, fittings and the like.

It is a further object of the invention to provide a simple, fool-proof and low-cost sensor for monitoring leakage providing an objective, non-quantitative indication of whether a leak is present.

These and other objects of the invention appearing as the discussion below proceeds are satisfied by the present invention of a sensor comprising a first fiber optic having a first end juxtaposed to a source of illumination and a second fiber optic having a first end disposed in juxtaposition to a detector of illumination. The second ends of the two fiber optics are axially aligned with one another for efficient light transmission therebetween. Under normal circumstances light from the source is detected at the detector.

In a first embodiment of the sensor of the invention, the second end of one of the fiber optics is biased to move away from the axially aligned position, but is normally restrained from doing so by a latch member made of a material deteriorating in the presence of a particular fluid to be monitored for leakage. For example, if gasoline is to be detected a rubber member under tension may be employed as a latch element. Rubber loses its tensile strength when exposed to gasoline. Therefore, if such a sensor is exposed to gasoline, the latch member deteriorates, allowing the bias to move the second end of one of the two fiber optics out of alignment with the other. Under these circumstances, light from the source is not detected at the detector, indicating that the latch has been destroyed by leaking gasoline. Monitoring the condition of the sensor may be performed at the location of the sensor or remotely.

In another embodiment, the tips of the two fiber optics may normally be maintained in alignment by a tube enclosing their tips. The tube is of a material which swells and moves the tips out of alignment with one another upon exposure to the fluid being monitored for leakage.

In a further embodiment of the sensor of the invention, a continuous fiber optic may be disposed to monitor leakage in an interstitial space in a double-walled pipeline or the like. Cutters responsive to the fluid being monitored are disposed at intervals along the fiber optic. The cutters cut the fiber optic when the sensor is exposed to the fluid being monitored.

Other objects and advantages of the present invention will become apparent from the following description of the preferred embodiments taken in conjunction with the accompanying drawings wherein like parts in each of the several figures are identified by the same reference characters.

BRIEF DESCRIPTION OF THE DRAWINGS

The invention will be better understood if reference is made to the accompanying drawings, wherein:

FIG. 3a is a view corresponding to FIG. 2a of a second embodiment of the sensor of the invention;

FIG. 3b is a view of the sensor of FIG. 3a in a view corresponding to FIG. 2b;

FIG. 4a is a view corresponding to FIG. 2a illustrating a third embodiment of the sensor of the invention;

FIG. 4b is a view of the sensor of FIG. 4a in a view corresponding to FIG. 2b;

FIG. 5 is a partly cut away side elevational view of a pipeline incorporating a continuous fiber optic having a number of leak sensors according to the invention disposed therealong;

FIG. 6a is a side elevational view of a leak sensor suitable for use in the system of FIG. 5 in a "normal" position; and FIG. 6b is a view of the sensor of FIG. 6a in a "leakage detected" condition.

DESCRIPTION OF THE PREFERRED EMBODIMENTS

Figure 1:
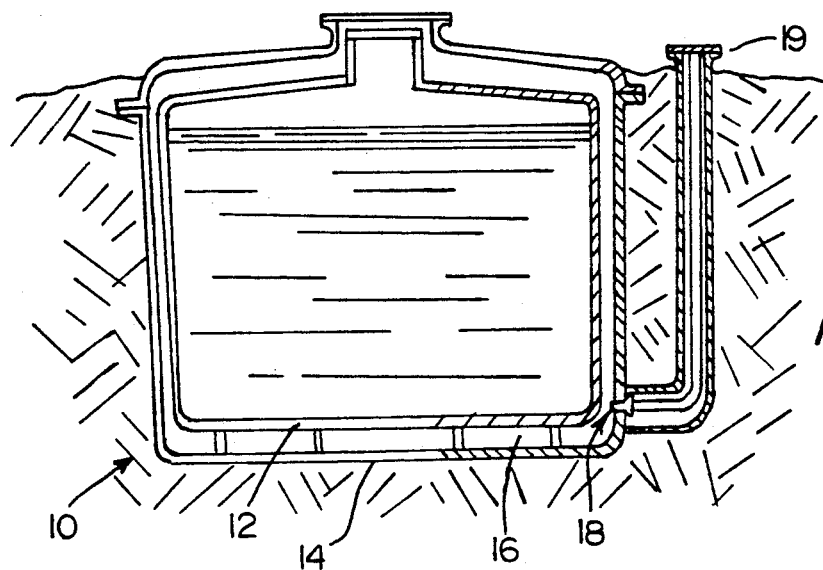
FIG. 1 is a cross-sectional view of a double-walled tank illustrating a typical installation of a leak sensor according to the invention.

Referring now to FIG. 1, a double-walled tank 10 includes an inner tank 12 within an outer tank 14. Tank 10 may be in or on the ground, as shown, or may form part of a tank ship, a railcar, or a highway truck. Tank 10 contains a fluid such as gasoline, leakage of which is to be detected. (The term "fluid" as used herein and in the appended claims is intended to include vapors as well as liquids.) An interstitial space 16 is defined between the inner tank 12 and the outer tank 14. A sensor 18 according to the invention extends through the wall of the outer tank 14 such that its active components extend into the interstitial space 16. As indicated the sensor 18 according to the invention is preferably disposed at a position in the interstitial space 16 where it is likely to detect leakage at an early stage thereof, typically at the lowest point.

The sensor of the invention may also be used to monitor leakage from a single-walled tank, e.g., by disposition in a gravel-filled sump in the ground near the single-walled tank, and may also be employed for fluid level detection. The sensor of the invention may likewise be employed to monitor leakage from other sources, such as pumps, valves, and other fittings. If the sensor 18 is disposed in an inaccessible position, the sensor 18 may be connected by signal leads or fiber optics to a more convenient monitoring location 19.

Figure 2A:
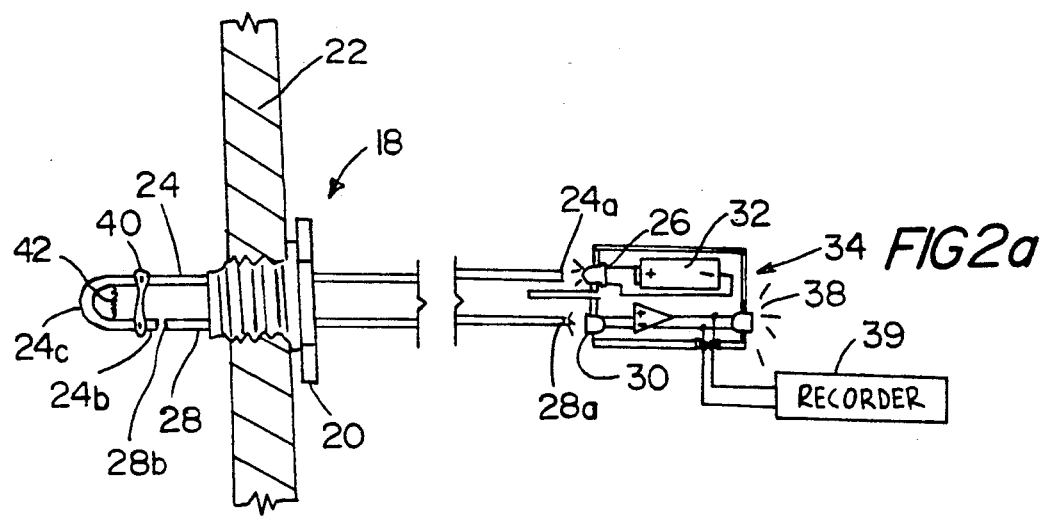
FIG. 2a is a cross-sectional view of the sensor according to the invention in a first embodiment thereof in a "normal" condition, and schematically shows the use of a source and a detector of illumination to monitor the condition of the detector.

FIG. 2a shows a first embodiment of the sensor 18 according to the invention in its "normal" condition, that is, before detection of leakage. As used to detect leakage from the inner tank of a double-walled tank, the sensor 18 may comprise a plug 20 extending through the wall 22 of the outer tank 14. A first fiber optic 24, that is, an optical fiber including a core and a cladding, and capable of efficiently transferring illumination from a source 26 juxtaposed to a first end 24a of the fiber optic 24 to a second end 24b thereof, extends through the plug 20. A second fiber optic 28 also extending through plug 20 has a second end 28b disposed in efficient light transmitting relationship with the second end 24b of the first fiber optic, and a first end 28a juxtaposed to a light detector 30, such as a phototransistor. In the "normal" condition of sensor 18, the second ends 24b and 28b of the first and second fiber optics 24 and 28 respectively are axially aligned with one another to ensure efficient light transmission therebetween. In the normal condition of the sensor 18 shown in FIG. 2a, light from the source 26 is transmitted along the first fiber optic 24, passes between second ends 24b and 28b, is transmitted along the second fiber optic 28, and is detected by the detector 30.

As indicated schematically the condition of the sensor 18 can be conveniently monitored by a hand-held monitoring instrument 34. Instrument 34 comprises, for example, a light source 26, a battery 32 for powering light source 26, a light detector 30 such as a phototransistor, an amplifier 36 for amplifying the signal provided by the light detector 30 upon detection of illumination, and an output indicator 38 such as an LED or the like illuminated to provide a visible indication that light from source 26 has been detected by detector 30. The light source 26 may also be a simple flashlight, and the condition of the sensor 18 may be monitored visually by attempting to detect light emitted from the first end 28a of the second fiber optic.

In order to permit monitoring of the condition of the sensor 18 from a remote location, the first ends of the first and second fiber optics may extend from an inaccessible location on tank 10 to an accessible monitoring location 19 to allow a worker to juxtapose an instrument 34 thereto, as shown in FIG. 1. Alternatively, the sensor assembly may comprise a light source and detector connected to a remote monitoring location by suitable power supply and control leads. The response of the sensor being monitored may also be recorded, as indicated at 39. Numerous other monitoring arrangements are possible.

According to the invention, the sensor 18 is constructed so that if the sensor is exposed to a fluid to be monitored the second ends 24b and 28b of the fiber optics 24 and 28 are no longer in their original efficient light-transmitting relation to one another. In typical embodiments of the sensor of the invention, exposure thereof to the fluid to be monitored will simply cause the mating ends 24b and 28b of the fiber optics 24 and 28 to move with respect to one another, effectively destroying the normal efficient light-transmitting relation. Hence a subsequent monitoring step carried out using instrument 34 (or otherwise, as noted) will indicate that a leak has occurred.

Use of the sensor of the invention to monitor tanks and other vessels for leakage simply requires that the condition of the sensor be periodically monitored, as above. It will be appreciated that the condition of the sensor may be monitored simply by determining whether light is transmitted from the source to the detector; no accurate measurement of the light transmissivity of the sensor need be made, for example.

Figure 2B:
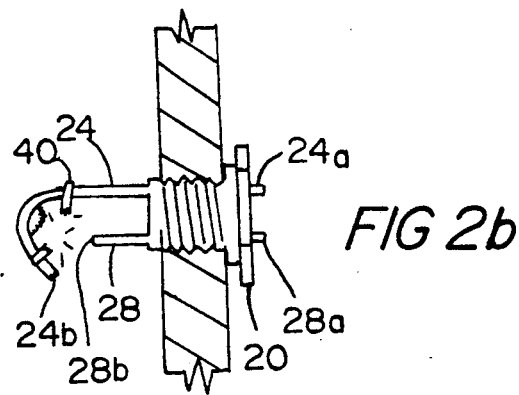
FIG. 2b is a view of the sensor of FIG. 2a, showing the sensor in its "leakage detected" condition.

In the embodiment of the sensor 18 of the invention shown in FIG. 2a and 2b, the second ends 24b and 28b of the fiber optics 24 and 28 are normally maintained in axial alignment by a band 40 of a material affected by the fluid being monitored, allowing one of the second ends to move out of axial alignment with the other. For example, if leakage of gasoline or another hydrocarbon is to be monitored, the band 40 may be made of a natural rubber losing its tensile strength when exposed to gasoline. The second end 24b of the first fiber optic 24 is biased to move out of axial alignment with the second end 28b of the second fiber optic 28 when the band 40 deteriorates upon exposure to the fluid to be measured. A bend 24c formed in the first fiber optic 24 upon manufacture may be sufficiently acute to provide adequate bias; alternatively, a separate biasing spring 42 may be provided to ensure that the end 24b of the first fiber optic 24 moves out of axial alignment with the end 28b of the second fiber optic 28 upon deterioration of the band 40 by exposure to gasoline.

When the sensor 18 is exposed to gasoline, the sensor 18 assumes the "leak detected" condition shown in FIG. 2b, wherein the band 40 has ruptured responsive to the bias exerted thereon by the bend 24c in the first fiber optic 24, and the second end 24b of the first fiber optic 24 has moved out of alignment with the second end 28b of the second fiber optic 28. Thereafter, if the instrument 34 is juxtaposed to the first ends 24a and 28a of the fiber optics, no illumination from source 26 will be detected by detector 30.

In lieu of the band 40, a mass of material soluble in the fluid to be monitored, such as tar in the case of a sensor intended to monitor the leakage of gasoline, may be employed to maintain the alignment of the second ends 24b and 28b against bias provided by a bend 24c and/or a spring 42. Alternatively, a mass of a material that swells when exposed to the fluid to be monitored, such as certain so-called "RTV" (i.e. room-temperature-vulcanizing) silicone rubber compounds sold for sealing, caulking, and like uses, may be disposed so as to positively urge the second end 24b of the fiber optic 24 out of efficient light-transmitting relation with the mating end 28b of the second fiber optic 28. Certain RTV silicone materials have the property of returning to their original configuration when dried after exposure to the fluid that causes their expansion; this property is useful in manufacturing a sensor according to the invention for liquid level detection or the like.

FIG. 3a shows a second embodiment of the sensor of the invention in its normal condition, while FIG. 3b shows the same sensor 18a in its "leak detected" condition. Again the sensor 18a comprises a plug 20, a first fiber optic 24 having a first end 24a adapted to be juxtaposed to a source of illumination carried by a monitoring instrument 34 (as in FIG. 2a), and again the first fiber optic 24 includes a second end 24b juxtaposed to a second end 28b of a second fiber optic 28. Fiber optic 28 also again includes a first end 28a adapted to be juxtaposed to a detector 34 for monitoring the condition of the probe 18a. However, in this case the second ends 24b and 28b are normally maintained in axial alignment with one another by a tube 46 of a material affected by exposure to the fluid to be monitored so that exposure to the fluid to be monitored destroys the efficient light-transmitting relation of the second ends 24b and 28b of the fiber optics 24 and 28. If the fluid to be monitored is gasoline, the tube 46 may be made of a natural rubber. When such a tube 46 is exposed to gasoline, it swells; thereupon, as shown in FIG. 3b, the ends 24b and 28b move out of efficient light-transmitting relation with one another. Illumination from a source juxtaposed to the first end 24a of the first fiber optic 24 is then not effectively communicated to the second fiber optic 28. This "leak detected" condition may be detected by an instrument 34 as shown in FIG. 2a, or otherwise, as indicated above. The selection of the material of the tube with respect to the fluid to be detected may also be such that when the tube is exposed to the fluid to be detected, it will contract, bringing the ends of the fiber optics more closely together and increasing the efficiency of transmission of light therebetween.

The selectivity of the probe 18a may be increased by encapsulating the tube 46 in a layer 48 of a material which is selectively porous to or soluble in a particular material to be monitored. For example, it might be undesirable for mechanical reasons to use a tube 46 of a material expanding upon exposure to either gasoline and water. Such a probe 18a would indicate that a leak had occurred upon exposure to either water or gasoline. To eliminate this ambiguity, the tube 46 may be encapsulated in a layer of a material 48, such as wax or tar, that is porous to or soluble in gasoline but resistant to water. Encapsulating the tube 46 will typically also slow deterioration of the material of tub 46 due to the passage of time.

In a further embodiment of the sensor of the invention shown in FIGS. 4a and 4b, the sensor 18b again comprises a plug 20 through which a first fiber optic 24 and a second fiber optic 28 extend, so that a first end 24a of a first fiber optic 24 may be juxtaposed to an optical source comprised by a monitoring instrument 34 (as in FIG. 2a) and a first end 28b of the second fiber optic can similarly be juxtaposed to a detector comprised by an instrument 34. A second end 24b of the first fiber optic 24 is juxtaposed to a second end 28b of the second fiber optic 28.

However, in the embodiment of the sensor 18b of the invention shown in FIGS. 4a and 4b, the ends 24b and 28b of the fiber optics 24 and 28 do not move with respect to one another upon exposure of the sensor 18b to a particular fluid to be monitored. Instead, the efficiency of transmission of light between the axially aligned ends 24b and 28b varies upon exposure of the sensor 18b to the fluid to be monitored. For example, many fiber optics are formed of plastic materials the surfaces of which are pitted by vapors of materials of interest, such as gasoline. Accordingly, if such fiber optics were used, it would be possible to monitor leakage of gasoline vapors by monitoring the light transmission of the sensor 18b over time, that is, by maintaining the second ends 24b and 28b of the fiber optics in a fixed relation to one another, periodically juxtaposing a source of consistent intensity to the first end 24a of the first fiber optic, measuring the illumination level detected at the first end 28b of the second fiber optic 28, storing the result employing recorder 39 (FIG. 2a), and comparing the result to previously stored results. A change would indicate that the light-transmitting qualities of the surfaces of the ends of one or both of the fiber optics 24 and 28 had deteriorated due to exposure to gasoline vapor.

In a further improvement, a member 50 of a material which is translucent or transparent in its normal state and opaque due to pitting or crazing after exposure to vapors of the fluid to be monitored may be disposed between the ends 24b and 28b of the fiber optics 24 and 28. For example, a thin sheet, e.g. 0.001 inch thick, of the plastic sold under the trademark "Lexan" by General Electric Company is normally transparent, but becomes substantially opaque when exposed to gasoline. Thus, if no light is detected at a first end 28b of second fiber 28 upon juxtaposition of a light source to first end 24b of first fiber 24, a leak may be taken to have been detected. Alternatively, the amount of light detected at a first end 28a of the second fiber optic 28 in response to juxtaposition of a source of consistent intensity to the first end 24a of the first fiber optic 24 may be monitored over time, e.g. employing recorder 39 (FIG. 2a), and any change taken to indicate that the sensor 18b has been exposed to vapor.

As discussed in connection with the embodiment of the invention described in connection with FIGS. 3a and 3b, the selectivity of the sensor 18b may be improved if necessary by encapsulating the mating second ends 24b and 28b of the fiber optics 24 and 28 in a material 52 which is selectively porous to or soluble in the particular fluid being monitored.

It will be appreciated by those of skill in the art that gaps between mating sections of fiber optics, as discussed in connection with the sensors of the invention discussed in connection with FIGS. 2a–4b, will occasion some attenuation of the illumination at each gap. Accordingly, sensors having gaps between adjacent fiber optic sections are best suited for applications wherein a limited number of sensors is adequate to measure the leakage in a particular space, such as the interstitial space of a tank assembly 10 shown in FIG. 1. If a large number of such sensors 18 were disposed in series, for example to monitor the condition at a like number of points in the interstitial space between the inner and outer pipes in a double-walled pipeline system, the total attenuation might be too great to provide reliable detection. According to another aspect of the invention, a continuous fiber optic may be disposed in the interstitial space between inner and outer pipes of a double-walled piping system and be positively cut if a leak occurs, providing an unambiguous indication of a leak into the interstitial space.

FIG. 5 shows a pipeline comprising an inner pipe 60 resting on supports 62 in an outer pipe 64. A continuous fiber optic 66 is disposed in the interstitial space 69 to detect leakage of liquid, and has a number of identical sensors 68 discussed in connection with FIGS. 6a and 6b disposed therealong. A second similar assembly of a continuous fiber optic and a number of sensors (not shown) may be disposed in the upper portion of the interstitial space 69 to monitor vapor leakage if desired.

A suitable sensor 68 is shown in its normal condition in FIG. 6a and in its "leak detected" condition in FIG. 6b. The sensor 68 comprises a pair of pincer arms 70 and 72 pivoted with respect to one another at a pivot 74. The pincer arms 70 and 72 are biased by a spring 80 to bring opposed jaws 76 and 78 together. The fiber optic 66 is disposed between cutting edges of the jaws 76 and 78. In the normal condition shown in FIG. 6a, the spring 80 is restrained from bringing the jaws 76 and 78 together by a latch member 82. Latch member 82 is affected by the fluid to be monitored so as to release the pincer members 70 and 72. In the embodiment shown the latch member 82 may comprise a band of material that loses its tensile strength when exposed to the fluid to be monitored, allowing the jaws 76 and 78 to sever the fiber optic 66. Alternatively, a mass of material soluble in the fluid to be monitored may be disposed between the ends of pincer members, adjacent to the jaws 76 and 78. When the sensor is exposed to the fluid to be monitored, and the mass of material dissolves, spring 80 will force the pincer members to pivot with respect to one another about the pivot member 74, bringing the jaws 76 and 78 together, and severing the cable 66. In a further embodiment, the spring 80 and latch 82 may both be supplanted by a mass of material that expands when exposed to the fluid of interest disposed between the ends of pincer arms 70 and 72 opposite the jaws 76 and 78. When this mass of material is exposed to the fluid to be monitored, it will swell, forcing the jaws 76 and 78 together, severing the fiber optic.

In each of these embodiments, monitoring of the condition of the fiber optic may be accomplished by disposing a source of illumination at one end of the fiber optic 66 and a detector at the opposite end. This monitoring step can be carried out periodically by two workmen working as a team at either end of the cable or remotely from a central control location, or otherwise.

Having described preferred and alternative embodiments of new and improved sensors for detecting leaks, and more generally for detecting the presence of particular fluids at the sensor locations, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A sensor for detecting the presence of a particular fluid, comprising:

a first fiber optic having a first end adapted to be juxtaposed to a source of illumination and a second end;

a second fiber optic having a first end adapted to be juxtaposed to a detector of illumination and a second end;

said second end of said second fiber optic being disposed in a particular efficient light-transmitting relationship with said second end of said first fiber optic in the absence of said particular fluid; and means for moving said second ends of said first and second fiber optics with respect to one another so as to alter said particular efficient light-transmitting relationship responsive to the presence of the particular fluid.

2. The sensor of claim 1, wherein said particular efficient light-transmitting relationship of said second ends of said fiber optics is close juxtaposition of said second ends of said fiber optics in axial alignment with one another.

3. The sensor of claim 1, wherein said means for moving includes means for biasing said second ends of said first and second fiber optics out of said particular efficient light-transmitting relationship with one another and said sensor further comprises means for maintaining said second ends of said first and second fiber optics in said efficient light-transmitting relationship with one another.

4. The sensor of claim 3, wherein said means for maintaining comprises means deteriorating in the presence of the particular fluid, whereby said second ends of said fiber optics are moved by said biasing means out of said particular efficient light-transmitting relationship.

5. The sensor of claim 4, wherein said deteriorating means includes a rubber member maintained under tension against said bias, and the particular fluid is a hydrocarbon liquid or vapor.

6. The sensor of claim 4, wherein said bias is provided at least in part by spring means adapted to separate said second ends upon deterioration of said means for maintaining responsive to the presence of said particular fluid.

7. The sensor of claim 4, wherein one of said fiber optics is curved to take a relatively sharp bend, whereby said bias is provided by the tendency of said fiber to straighten.

8. The sensor of claim 3, wherein said means for maintaining said second ends of said first and second fiber optics in efficient light-transmitting relationship with one another comprises a member adapted to receive and retain said second ends of said first and second fiber optics, said member being formed of a material deteriorating upon exposure to said particular fluid.

9. The sensor of claim 8, wherein said member adapted to receive said second ends is a tube for receiving said second ends of said first and second fiber optics, said tube being at least partially soluble in said particular fluid.

10. The sensor of claim 8, wherein said member is a solid mass of said material at least partially soluble in said particular fluid.

11. The sensor of claim 1, wherein said means for moving comprises a tube for receiving said second ends of said fibers from opposite ends thereof and for maintaining said second ends in axial alignment to establish said efficient light-transmitting relationship therebetween in the absence of said particular fluid, and wherein said tube is formed of a material that swells upon exposure to said particular fluid, moving second ends of said fibers away from one another, and effectively destroying said efficient light-transmitting relationship therebetween.

12. The sensor of claim 1, wherein said means for moving is encapsulated in a material soluble in said particular fluid.

13. The sensor of claim 1, wherein the first ends of said fiber optics extend through bores extending axially through a plug adapted to be threaded into a threaded hole extending into a space wherein the presence of said particular fluid is to be monitored, whereby said second ends of said fiber optics may be conveniently disposed in said space.

14. A sensor for detecting the presence of a particular fluid, comprising:
a first fiber optic having a first end adapted to be juxtaposed to a source of illumination, and a second end adapted to be juxtaposed to a detector of illumination; and
cutter means to cut said fiber optic responsive to exposure to said particular fluid, wherein said cutter means comprises a releasably latched cutter biased to cut said fiber optic and a latch normally preventing said cutting, said latch being of a material deteriorating in the presence of said particular fluid.

15. The sensor of claim 14, wherein the material of said latch is a rubber material and said particular fluid is a hydrocarbon.

16. The sensor of claim 14, wherein said cutter means comprises a pair of cutting jaws forced together to cut said fiber optic by expansion of a mass of material disposed between pincer arms pivoted with respect to one another and supporting said cutting jaws, said mass of material expanding in response to exposure to said particular fluid.

17. A method of detecting a leak of a particular fluid from a vessel into a space, comprising the steps of:
disposing a continuous fiber optic in said space, said fiber optic having a first end adapted to be juxtaposed to a source of illumination and a second end adapted to be juxtaposed to a detector of illumination;
disposing one or more cutters adapted to cut said fiber optic in response to exposure to said particular fluid in operative relation to said fiber optic; and periodically monitoring the light-transmissive characteristics of said fiber optic, to determine whether said fiber optic has been cut by one or more of said cutters responsive to exposure of said one or more of said cutters to said fluid.

18. The method of claim 17, wherein each of said one or more cutters comprises a latch element of a material having a characteristic affected upon exposure of said element to said particular fluid, whereupon said cutter is activated to cut said fiber optic.

19. The method of claim 18, wherein said material of said latch element swells upon exposure to said fluid.

20. The method of claim 18, wherein said material of said latch element loses tensile strength upon exposure to said fluid.

21. A method of detecting the presence of a particular fluid in a space, comprising the steps of disposing second ends of first and second fiber optics in said space, said first fiber optic having a first end adapted to be juxtaposed to a light source, and said second fiber optic having a first end adapted to be juxtaposed to a light detector;
maintaining said second ends of said first and second fiber optics in axially-aligned light-transmitting relation to one another in absence of said particular fluid;
providing bias means for altering said axially-aligned light-transmitting relation responsive to exposure of said means for altering said fluid;
providing means for maintaining said second ends of said first and second fiber optics in said axially-aligned light-transmitting relation in absence of said particular fluid; and
periodically monitoring the efficiency of transmission of light between said first and second fiber optics, to determine whether said means for altering has been exposed to said fluid.

22. The method of claim 21, wherein said means for maintaining comprises an element of a material losing tensile strength upon exposure to said fluid.

23. The method of claim 21, wherein said means for altering said axially-aligned light-transmitting relation comprises an element of a material swelling upon exposure to said fluid.

24. The method of claim 23, wherein said material of said element returns substantially to its original configuration upon cessation of its exposure to said fluid.

* * * * *